PHASE DETECTOR
Filed July 2, 1949
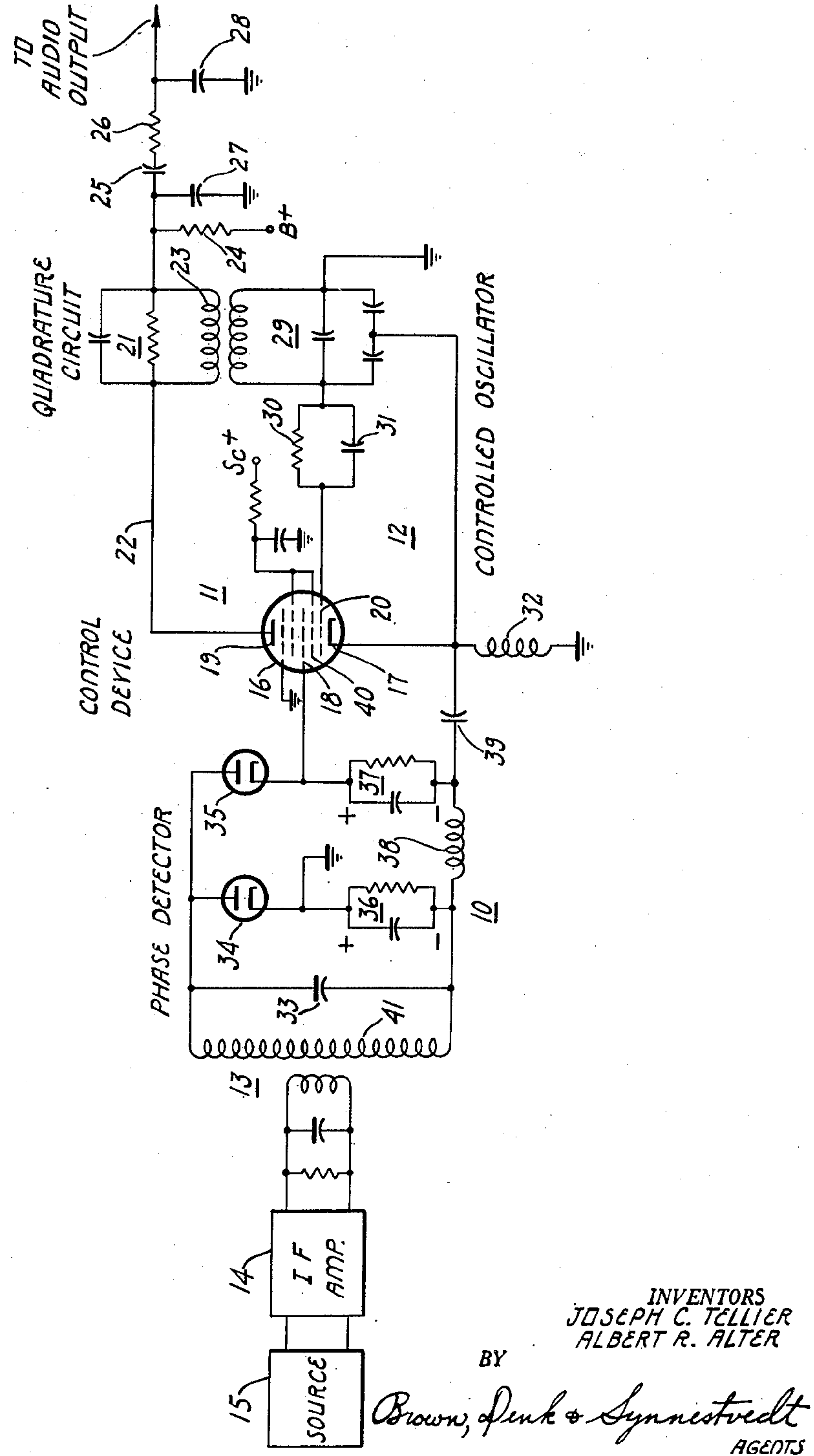
INVENTORS
JOSEPH C. TELLIER
ALBERT R. ALTER
BY
Brown, Denk & Synnestvedt
AGENTS Patented May 22, 1951 2,554,391

UNITED STATES PATENT OFFICE 2,554,391

PHASE DETECTOR

Joseph C. Tellier, Penn Wynne, and Albert R. Alter, Philadelphia, Pa., assignors to Philco Corporation, Philadelphia, Pa., a corporation of Pennsylvania Application July 2, 1949, Serial No. 102,882

6 Claims. (Cl. 250—27)

The present invention relates broadly to phase detectors and, more particularly, to circuit arrangements for detecting the instantaneous phase difference between two signals. Although by no means limited thereto, such phase detectors find widespread application in frequency control circuits, frequency modulation detectors, and the like, where they frequently serve to control the frequency of a locked-in oscillator.

It is now known, for example, that a very desirable type of frequency modulation detector comprises a source of incoming frequency-modulated signals, a variable-frequency oscillator normally tuned approximately to the center frequency of those signals, and a phase detector interconnecting the source and the oscillator and so arranged as to sense the phase difference between signals from the source, on one hand, and from the oscillator, on the other, and to develop a control voltage in response to this phase difference whereby to lock the oscillator signal into synchronism with the incoming signal. Such an arrangement is, of course, desirable primarily because it avails itself of the inherent characteristics of the locked-in oscillator to render the circuit virtually insensitive to most amplitude variations in the source signal. For a showing of a specific embodiment of such a frequency modulation detector, reference may be had to our copending application, Serial Number 91,282, filed May 4, 1949.

Ordinarily the circuit described in the above-identified copending application follows the last intermediate frequency stage of amplification, the secondary winding of the last I.-F. transformer being center-tapped and utilized as the input component of a balanced, double-diode type of phase detector. The incoming signal is applied to this phase detector by way of the mutual inductive coupling existing between the primary and secondary windings of the I.-F. transformer, and the oscillator signal which is to be utilized for phase comparison is applied thereto cophasally via the similar electrodes of the two diodes which are not directly connected to the ends of the transformer secondary winding. The prior art phase detector further comprises an output network across which an amplitude-varying output proportional to the phase difference between the signals is developed. This output network ordinarily comprises a pair of serially connected resistors of preferably equal magnitude shunted by a condenser, the junction of the resistors being connected to the center-tap of the transformer secondary winding; in addition, this center-tap is grounded for signals of intermediate frequency. The operation of the phase detector described in the above-identified copending application is conventional in the sense that it relies on the balancing of potentials developed across each of the above-mentioned resistors to give zero output thereacross in the absence of oscillator signals, and to give a non-varying output whenever the oscillator signal is in a predetermined fixed phase relation to the I.-F. signal.

Unfortunately, the reliance placed on this balancing effect in prior art phase detectors is all too often unjustified. Primarily due to inequalities in the characteristics of the two halves of the center-tapped transformer secondary winding, the potentials developed across the series load resistors do not necessarily balance out, under the conditions hereinbefore described. In that case, any amplitude modulation which may be present on the I.-F. signal upon application of the latter to the phase detector will cause the detector to develop an amplitude modulated output signal which is proportional to the aforesaid I.-F. amplitude modulation. In particular, the sloping frequency-response characteristic of the I.-F. amplifier circuits outside the desired pass-band thereof may transform some of the received frequency-modulated signals into corresponding amplitude-modulated signals to which the prior art phase detector is capable of responding by producing a similar amplitude modulated output.

In the frequency-modulation detector under discussion this is not a serious shortcoming, as long as the oscillator remains synchronized, due to its inherent A.-M. rejection properties. If, however, the receiver is detuned to the point where the oscillator is no longer synchronized with the incoming signal, then the unbalance of the detector will enable the latter to sense the A.-M. signal developed by the I.-F. circuits and give rise to an audio-frequency signal which will manifest itself in the audio output of the system. Thus the unbalance of the phase detector gives rise to two spurious tuning points, one on each side of the correct tuning point. Each of these points is usually characterized by considerable distortion due to the rudimentary nature of the F.-M. to A.-M. conversion which takes place in the I.F. circuits. It has been found that, with a reasonably strong received signal, the audio output at these spurious tuning points may well be of the same order of magnitude as that obtained at the desired tuning point. This spurious effect is, of course, highly undesirable from every point of view.

It is, accordingly, a primary object of the invention to provide a frequency-modulation detector which is adapted to sense the phase difference between an incoming signal and a locally generated signal, and to synchronize the locally generated signal with the incoming signal.

It is another object of the invention to provide a phase detector arranged to detect the phase difference between two signals, while being incapable of detecting amplitude variations therein.

It is still another object of the invention to provide a phase detector which does not suffer from the defects heretofore introduced by unbalance between the two halves of a center-tapped inductor.

To the foregoing general ends, the invention provides a phase detector which relies, for its A.-M. rejection, upon the cancellation by identity of exactly equal signals developed across one and the same inductor, instead of on the balancing of two different inductors—or two halves of the same inductor—which, in practice can rarely be exact.

As for the specific arrangement of circuits constructed in accordance with our invention, reference is made to the subsequent discussion and to the accompanying drawing wherein the single figure is a schematic circuit diagram illustrative of a preferred embodiment of our invention.

As has been pointed out hereinbefore, our invention finds one of its major fields of application in connection with a frequency modulation detector of the indirectly-synchronized oscillator type. The preferred form which a physical expression of our inventive concept may take, when incorporated in such a circuit, is illustrated in the figure to which more particular reference is now made. There is shown a frequency-modulation detector comprising, in general terms, a phase detector 10, an oscillator control device 11, and a controlled oscillator 12.

The frequency-modulated intermediate-frequency carrier is applied to phase detector 10 by way of the tuned primary winding of the I.-F. transformer 13 which is here shown connected to the output of I.-F. amplifier 14, this latter, in turn, deriving its signals from a source 15. The details of construction of the phase detector proper are novel and closely related to our inventive concept, as will be shown in more detail hereinafter. Similarly, the manner in which oscillations derived from oscillator 12 are simultaneously applied to this phase detector for phase comparison with the I.-F. signal is closely related to the basic inventive concept and is, consequently, reserved for subsequent discussion.

The control device 11 may, in its preferred form, comprise a multi-grid vacuum tube 16, of which the cathode 17, control grid 18 and anode 19 are principally active in the role of oscillator control device 11; control grid 20, cathode 17 and screen grid 40 simultaneously perform the functions of the oscillator triode or controlled oscillator 12. Associated with the control portion of tube 16 is a radio frequency output circuit comprising the anode 19 and the resonant plate circuit 21, and an audio frequency output circuit comprising anode 19, conductor 22, inductance coil 23 (which, of course, has no effect on the audio-frequency circuit), the audio-frequency plate load resistor 24, coupling condenser 25, and the radio-frequency filter combination 26—27—28.

The controlled oscillator 12 comprises the triode portion of tube 16 hereinbefore described, in combination with a tank circuit 29, a grid leak resistor 30 and a grid leak by-pass condenser 31. The junction of the two series tank circuit condensers is returned to the cathode of tube 16, the cathode, in turn, being connected to ground by way of a radio-frequency choke 32. It will be understood, in this connection, that the choice of a suitable controlled oscillator is largely arbitrary and only restricted by the necessity of its functioning in the manner hereinafter set forth. Thus, by making minor changes in the circuit arrangement, of a nature well within the scope of anyone skilled in the art, other types of oscillators may be substituted, such as, for example, one of the conventional Colpitts or Hartley type; such substitutions are, therefore, considered within the scope of the present inventive concept. The output of the oscillator is, in this embodiment, taken off at the cathode which is shown connected to the phase detector in a manner which, together with the arrangement of the phase detector proper, constitutes the principal feature of the invention.

Specifically, in accordance with the invention, phase detector 10 comprises the secondary winding 41 of I.-F. transformer 13, a condenser 33 shunting the winding and combining therewith to form a tuned input circuit, a pair of diodes respectively designated by reference numerals 34 and 35, a pair of R–C networks 36 and 37 respectively connected to the corresponding cathodes of diodes 34 and 35, and an R.-F. choke 38. In the preferred arrangement depicted in the figure the series combination of diode 34 and R–C network 36 is connected across the tuned input circuit, and the series combination of diode 35, R–C network 37, and choke 38 is connected in shunt therewith. The junction of one of the diodes (e. g. diode 34) and its associated R–C network (36) is grounded, while the junction of the other diode and its respective R–C network is connected to control grid 18. Oscillator signal derived from the cathode 17 of tube 16 is applied to the phase detector, via D.-C. blocking condenser 39, at the junction of this choke 38 and the last-named series combination.

The operation of the device here described and illustrated is as follows: Dealing, for the moment, with the incoming frequency-modulated signal exclusively, this signal is applied to the tuned input circuit of the phase detector via the mutual inductive coupling which exists between the primary and secondary windings of transformer 13. Thence, the signal follows a pair of parallel paths, one of which comprises diode 34 and the R–C network 36 which is connected thereto, while the other one includes diode 35, its associated R–C network 37, D.-C. blocking condenser 39, choke 32, ground, and R–C network 36. Since both diodes 34 and 36 are similarly poled with respect to the incoming signal (that is, similar electrodes are connected to one end of the tuned input circuit), this signal, in its positive swing, will cause each diode to conduct and to develop a unidirectional potential across its associated R–C network. With proper selection of the time constant of the R–C networks, the unidirectional potentials thus developed will reach values roughly equal to the applied signal voltage and having the same polarity, as indicated in the figure. It is noted that the two R–C networks 36 and 37 are connected, in series, between grid 18 of tube 16 and ground, and therefore the algebraic sum of the voltages developed across these R–C circuits will appear in the grid-cathode circuit of tube 16. Because the negative terminals of the R–C circuits are connected together (through choke 38—which has negligible impedance at the low frequencies involved), the potential developed across one will cancel that developed across the other and, since they are developed in response to the same signal voltage, their cancellation will be complete for all practical purposes. Should the amplitude of the incoming F.-M. signal vary, due to the sloping frequency response characteristics of the I.-F. stages, as hereinbefore described, or due to A.-M. noise in the signal, or indeed due to any cause whatever, this will in no way affect the cancellation by identity, as hereinbefore described. The present invention therefore overcomes the principal objection to prior art phase detector arrangements, which was hereinbefore outlined.

When the controlled oscillator 12 is in operation its output signal is developed across choke 32 which connects cathode 17 to ground. The path which it follows from there includes condenser 39, R–C network 37, diode 35, the tuned input circuit 33, 41, R–C network 36, and the ground connected thereto. Choke 38 is provided for the purpose of preventing the condenser of R–C network 36 from directly shorting to ground the oscillator signal developed across choke 32. As far as the oscillator signal is concerned, diodes 34 and 35 are connected back-to-back, with the result that virtually no conduction of diode 34 will take place due to the oscillator signal. Should some such conduction take place, however, the current flowing through the diode during such conduction will be incapable of developing any corresponding potential across the associated R–C network 36 because of the intervening ground connection which effectively isolates diode 34 from R–C network 36 for oscillator signals. On the other hand, current will flow through diode 35 in response to the oscillator signal and a unidirectional potential proportional to the amplitude of this signal will be developed across R–C network 37.

Thus, both the incoming signal and the oscillator signal cause current flow through R–C network 37. Consequently, across R–C network 37, a unidirectional potential is developed in response both to the incoming signal and the oscillator signal, which is proportional to the vector sum of these two signals and whose amplitude varies with the instantaneous phase difference therebetween. Since the incoming signal alone causes current flow into R–C network 36, the potential developed thereacross will be proportional to the incoming signal only, being entirely unaffected by the presence or absence of the oscillator signal or by any amplitude or phase variations therein.

By virtue of the circuit connections hereinbefore described, the control signal applied to the control grid 18 of the control tube 16 is proportional to the algebraic difference between the potentials developed across R–C networks 36 and 37. It has already been shown that, in the absence of oscillator signals, this difference is fixed. In the presence of oscillator signals, however, this difference is proportional to the phase difference between the incoming signal and the oscillator signal. The insensitivity of the circuit to amplitude variations in the incoming signal will be maintained, since such variations are cancelled out by subtraction of the identical potential components due to the incoming signal between the two R–C networks. In addition, this insensitivity is improved whenever the amplitude of the incoming signal is considerably in excess of the amplitude of the controlled oscillator signal, since a large incoming-to-oscillator signal-ratio will yield improved cancellation of potential components developed in response to the incoming signal across each of the R–C networks 36 and 37.

In the preferred embodiment, the two series combinations of diodes and R–C networks are so oriented that the anodes of the two diodes are joined together and jointly connected to one end of the tuned input circuit. The ends of the two R–C networks not connected to the diodes are then returned to choke 38, one to each end thereof. However the diode elements are interchangeable, under some circumstances, that is, the cathodes of the diodes may be connected together, instead of their anodes, as here illustrated, provided only the fluctuations in grid potential on tube 16 are significant and not their instantaneous polarity. In that case, each anode would of course, be connected to its respective R–C network, leaving the remainder of the circuit unchanged. This, however, is permissible only if the electrodes of both diodes are simultaneously interchanged, since reversal of only one diode would preclude the desired differential mode of operation of the phase detector.

In addition, the entire series combination whose junction is connected to grid 18—in this case diode 35 and network 37—may be inverted so that the anode of the diode is connected to the oscillator end of choke 38. In that case, however, it becomes desirable to connect a low-pass filter between the junction point of the series combination elements and grid 18 having a cut-off frequency just above the desired audio-frequency range. Such a filter may, of course, always be included in the circuit, but, in the form illustrated, is not essential, since the R–C network 37 usually performs its function sufficiently well.

For a discussion of the perculiar advantages which accrue from the use of such a filter and of the conditions which may necessitate its presence, reference is made to the copending application of William E. Bradley and Joseph C. Tellier, Serial Number 74,732, filed February 5, 1949, and assigned to the assignee of the present invention.

In accordance with the mode of operation hereinbefore described, the phase detector provides an output component, under the simultaneous application of incoming signals and controllled oscillator signals, whose amplitude is proportional only to the phase difference between these two signals. In order to fulfill some of the other stated objects of the invention, some ancillary characteristics must also be imparted to the circuit arrangement illustrated in the drawing. Thus, the tank circuit tuning of the oscillator is so adjusted that, when an undeviated I.-F. signal is applied to the phase detector via I.-F. transformer 13, the operating frequency of the oscillator is identical with that of the undeviated I.-F. signal, and the oscillator voltage in phase quadrature relation with the input signal. This phase relation is maintained by means of the R.-F. control voltage supplied to the oscillator by way of a quadrature circuit which, in this instance, comprises the resonant circuit 21 inductively coupled to the oscillator tank circuit 29.

At this juncture it is deemed advisable to point out that, while not essential to a realization of all the features of the invention, it is preferred that the bias voltages supplied to tube 16 be of such magnitude that tube 16 operates under Class C conditions. A Class C mode of operation in which plate current is permitted to flow in tube 16 during only about 60° out of every 360° of each cycle has been found useful in practice.

For a more detailed discussion of various ancillary features associated with the above-mentioned quadrature circuit, as well as for an analysis of the peculiar advantages of the preferred Class C operation of tube 16, reference is made to the copending application of William E. Bradley, Serial No. 576,057, filed February 3, 1947, now U. S. Patent 2,494,795, issued January 17, 1950, and assigned to the assignee of the present invention.

The operation of the remaining components of the illustrated embodiment, which coact with our novel phase detector to form an improved frequency-modulation detector, is largely conventional. Thus, when the frequency of the input signal shifts, the output voltage of phase detector 10 changes in accordance with the concomitant phase change, the amplitude of the R.-F. component of output from control device 11 changes, and this change is in such a direction as to cause the frequency of oscillator 13 to follow that of the I.-F. input signal. Of course, the initial phase quadrature relation will not be maintained as the frequency of the applied carrier varies, the departure from phase quadrature being a function of the deviation of the applied carrier wave. Because of this variation about the mean quadrature relation, the phase detector will supply a low-frequency output voltage, in the manner hereinbefore fully described, the amplitude of which is proportional to the deviation of the applied carrier from its mean frequency. The low-frequency output is developed across R–C network 37, and is applied to control grid 18 of control device 11, as shown in the figure, where it is utilized to control the amplitude of the R.-F. component of the output of control device 11, with the results hereinbefore outlined.

It will be understood that the particular values of resistors and condensers which comprise R–C networks 36 and 37 do not constitute an essential feature of the invention. In general terms, however, both condensers should be sufficiently large to by-pass signals of intermediate frequency, and the network time constants sufficiently long to permit development of potentials of audio-frequency periodicity thereacross. Typical values which were successfully employed in a detector for commercial frequency-modulation transmissions in the 88–108 megacycle band, with an intermediate frequency of about 9.1 megacycles, were 100,000 ohms for each of the resistors and 1000 micromicrofarads for each of the condensers.

It will be understood that our inventive concept is by no means limited, in its applicability, to frequency-modulation detectors, but may function to advantage in most cases where phase detectors are required. In any event, the single embodiment here illustrated is capable of considerable modification by those skilled in the art without transcending the boundaries of our invention; we, therefore, desire its scope to be limited only by the appended claims.

We claim:

1. A circuit arrangement for detecting the relative phase variations between a carrier wave derived from a first source and a carrier wave derived from a second source, said circuit arrangement comprising: a pair of input terminals and means connecting said input terminals to said first source, a first current rectifying element and a first parallel resistance-capacitance network joined in series circuit relation between said terminals, a second current rectifying element, a second parallel resistance-capacitance network and a carrier-frequency choke also joined in series circuit relation and connected between said terminals, and means capacitively connecting the junction of said second resistance-capacitance network and said choke to said second source.

2. A circuit for detecting the phase difference between two signals, said circuit comprising: a first input circuit including a transformer having primary and secondary windings, said secondary winding being tuned, means for applying one of said signals to said primary winding, a pair of parallel paths, each interconnecting the two ends of said secondary winding, one of said paths comprising a current-rectifying element and a parallel resistance-capacitance network joined in series circuit relation, and the other of said paths comprising a current-rectifying element, a parallel resistance-capacitance network and a signal-frequency choke, all joined in series circuit relation, a second signal input circuit comprising a pair of input terminals, one of said terminals being constituted by the junction of the current-rectifying element and the parallel network of said first path, and the other terminal being constituted by the junction of the choke and parallel network of said second path, and capacitive means for applying the other of said signals to said terminals.

3. A phase detector comprising: a delta network, one side of said network being comprised of the series combination of a first current-rectifying element and a first resistor, said resistor being shunted by a first condenser, another side of said delta network being comprised of the series combination of a second current-rectifying element and a second resistor, said second resistor being shunted by a second condenser, and the third side of said delta network being comprised of a signal-frequency choke, a first signal-input circuit comprising the terminal points of said one side, and a second signal-input circuit comprising the junction of the components of said one side and the junction of said other and said third side.

4. The circuit arrangement of claim 3, characterized in the provision of a detected-signal utilization means, the input circuit whereof is connected between the said junction of components of said one side and the junction of the components of said other side.

5. A circuit arrangement for detecting the relative phase variations between a frequency-modulated carrier wave derived from a first source and a frequency-modulated carrier wave derived from a second source, said circuit arrangement comprising: a carrier-frequency choke, a pair of resistors, each of said resistors being shunted by one of a pair of condensers to form a pair of parallel resistance-capacitance networks, and a pair of diodes, one end of said choke and one end of one of said networks being joined at a first junction, the other end of said one network being joined to one electrode of one of said diodes at a second junction, the other similar electrodes of said diodes being joined at a third junction, the remaining electrode of the other of said diodes being joined to one end of the other of said networks at a fourth junction, and the other end of the last-named network being joined to the other end of said choke at a fifth junction, means conductively connecting said first source intermediate said third and fifth junctions, means capacitively connecting said second source intermediate said first and fourth junctions, and means connected to said second and fourth junctions for deriving an output signal proportional to said relative phase variations.

6. A frequency modulation receiver comprising elements including: a source of frequency-modulated carrier waves, said source having a pair of output terminals; a carrier wave transformer having at least a primary and a secondary winding, said primary winding being connected between said pair of output terminals; a phase detector comprising, in combination, a carrier-frequency choke, a pair of resistors, each of said resistors being shunted by one of a pair of condensers to form a pair of parallel resistance-capacitance networks, and a pair of diodes, one end of said choke and one end of one of said networks being joined at a first junction, the other end of said one network being joined to one electrode of one of said diodes at a second junction, the other similar electrodes of said diodes being joined at a third junction, the remaining electrode of the other of said diodes being joined to one end of the other of said networks at a fourth junction, and the other end of the last-named network being joined to the other end of said choke at a fifth junction, said phase detector further having a pair of input circuits, one of said input circuits comprising said third and fifth junctions, and the other one of said input circuits comprising said first and fourth junctions; said secondary winding being connected to said one input circuit and arranged to apply said carrier waves to said phase detector by way of the mutual inductive coupling between said primary and secondary windings; an oscillator constructed and arranged to generate oscillations at approximately the center frequency of said carrier waves; means capacitively connecting said oscillator to the other of said input circuits; the output of said phase detector being derived between said second and fourth junctions, said output being a function of the instantaneous phase difference between said oscillations and said frequency-modulated carrier waves; a reactance control circuit coupled to said oscillator, said reactance control circuit being adapted to control the frequency of the generated oscillations in accordance with a control signal; and means for applying the output of said phase detector to said reactance control circuit as a control signal.

JOSEPH C. TELLIER.
ALBERT R. ALTER.

REFERENCES CITED

The following references are of record in the file of this patent:

UNITED STATES PATENTS

| Number | Name | Date |
|---|---|---|
| 2,332,540 | Travis | Oct. 26, 1943 |
| 2,429,216 | Bollman | Oct. 21, 1947 |
| 2,462,759 | McCoy | Feb. 22, 1949 |